United States Patent [19]

Weido

[11] Patent Number: 5,179,541
[45] Date of Patent: Jan. 12, 1993

[54] ACOUSTIC BOREHOLE TELEVIEWER

[75] Inventor: Vincent C. Weido, Houston, Tex.

[73] Assignee: Western Atlas International, Inc., Houston, Tex.

[21] Appl. No.: 876,055

[22] Filed: Apr. 28, 1992

[51] Int. Cl.$^5$ ............................................. G01V 1/40
[52] U.S. Cl. .................................................... 367/69
[58] Field of Search ............................ 367/69, 65-67, 367/25, 28

[56] References Cited

U.S. PATENT DOCUMENTS

| | | | |
|---|---|---|---|
| 4,691,307 | 9/1987 | Rambow | 367/69 |
| 4,855,965 | 8/1989 | Rambow | 367/69 |
| 4,984,221 | 1/1991 | Dennis | 367/69 |

OTHER PUBLICATIONS

Circumferential Borehole Imaging Tool, Western Atlas International, Inc. Brochure, 1991.

*Primary Examiner*—Ian J. Lobo
*Attorney, Agent, or Firm*—William A. Knox

[57] ABSTRACT

A system is provided for optimizing the output power of an acoustic wavetrain emitted from a transducer rotatably mounted in a downhole borehole televiewer for scanning the sidewall of the borehole. The purpose is to prevent destructive interference between the caudal portion of the outgoing wave train and the returning echo signals from the borehole sidewall.

6 Claims, 3 Drawing Sheets

ACOUSTIC BOREHOLE TELEVIEWER

BACKGROUND OF THE INVENTION

1. Field of the Invention

This invention is concerned with a downhole acoustic televiewer. Disclosed is a method for discretely controlling the amplitude level of the excitation voltage applied to an acoustic transducer for the purpose of eliminating the interference between the caudal portions of an outgoing pulse and the returning echo signals reflected from the side wall.

2. Discussion of the Prior Art

When boreholes are drilled deep into the earth, it is of great interest geologically to examine the texture and composition of the material making up the borehole wall. One method would be to lower an optical television camera into the hole to a desired depth. Such a camera would be designed to circumferentially scan the side wall as the camera is drawn back up the hole to the surface. Small faults, dip of the strata, vugs, color and texture could be displayed on a monitor for study. Unfortunately, the drilling fluid used in drilling most boreholes, such as oil wells, is opaque to optical radiation. Therefore, down-hole formation-scanning tools use ultra-sonic radiation in place of optical radiation for imaging the borehole side-wall structure.

Typically, a down-hole acoustical scanner consists of one or more piezoelectric transducers mounted on a rotating head housed in a sonde. For purposes of this exemplary discussion, it will be assumed that the borehole is substantially vertical although horizontal holes are not excluded. The sonde may be ten feet or so long and three or four inches in diameter. The transducer is mounted in the sonde, behind an acoustic window, in a pressure-compensated, oil-filled cell. Other compartments in the logging sonde include electronics for actuating the transducer, for controlling the rotary head and for interfacing the electronics with control and display apparatus on the surface through a multiconductor logging cable.

In operation, the transducer(s) is caused to circumferentially scan the borehole sidewall at an exemplary scanning rate of six, 360° scans per second as the sonde is passed through the borehole at, perhaps, five or ten feet per minute. A flux gate magnetometer in included in the sonde. The beginning of a scan occurs each time the rotary head is aligned with magnetic north. In some instruments, a three-axis accelerometer is used in place of, or in addition to the magnetometer. The transducer thus scans the borehole sidewall in a continuous spiral from the total depth to the surface.

The transducer is pulsed at a rate of 125 to 250 pulses per scan to provide an equal number of data samples per scan. The pulse frequency varies from 250 kHz to 2 mHz. Preferably the lower frequency is used to get better penetration through the borehole fluid which is highly attenuating at higher pulse frequencies. The driving energy may be coupled to the transducer(s) mounted on the rotating head through a rotary transformer. The vertical resolution between scans depends on the rate at which the sonde is passed through the borehole. Typically the vertical resolution is about 0.3 inch per scan.

The transducer element(s) preferably is focused. Because the borehole may include several different diameters, two transducers, having different focal lengths may be mounted on the rotary head. A short-focus element is used for hole diameters up to about six inches; the longer-focus unit is used in a hole with a greater diameter. Use of focused transducer elements minimizes beam spreading thereby providing improved horizontal resolution which is of the same order of magnitude as the vertical resolution. A third, fixed transducer is provided for use with a mud cell to measure the instantaneous drilling-fluid (mud) velocity.

A piezoelectric transducer may act as an acoustic transmitter or an acoustic receiver. At each sample time, the transducer, switched to the transmit mode, sends out a pulse as above described. The acoustic pulse propagates through the borehole fluid and is reflected from the borehole wall. Subsequently to pulse transmission, the transducer assumes a listening mode whereupon it receives the reflected pulse, reversed in phase with respect to the outgoing pulse, as a data sample. The received acoustic pulse is converted to an electrical signal which is delivered to data-processing circuitry on the surface. The transducer thereupon reverts back to the transmit mode for the next sample.

The quantities of interest are the time of flight and the relative amplitudes of the respective reflected echo pulses. The flight time, multiplied by the fluid velocity is a measure of the distance between the transducer and the sidewall, that is, the tool can serve as an acoustic caliper. The echo-signal amplitude may be interpreted as a function of the texture as well as the composition of the sidewall material as estimated from the characteristic acoustic impedance thereof. The respective data samples from a plurality of scans may be processed and displayed as a type of tomogram as a function of depth when cut along the north line and laid out flat. A description of a conventional system is found in a brochure "Circumferential Borehole Imaging Log", published by the assignee of this invention.

The pulser circuit typically employs a moderate-sized capacitor that is connected across a transformer through a normally-open switching device. The capacitor is charged. When the switch is closed, the capacitor discharges through the transformer thereby exciting the transducer to generate an acoustic pulse. Ideally, the excitation voltage would be a spike, that is, a Dirac function. But the capacitance/inductance parameters of the circuit cause the circuit to resonate. The excitation voltage, and hence the outgoing acoustic pulse, degenerates to an initial pulse followed by a caudal wave train of significant length in time.

The caudal wave train exhibits an exponential amplitude-decay rate. That phenomenon is sometimes referred to as ringdown. The ringdown time is defined as the time required for the wavetrain amplitude to decay to an arbitrarily-selected lower amplitude limit such as 40 to 60 dB down from maximum amplitude. The excitation voltage, v, is given by the well-known formulation:

$$v = Ve^{-at}\sin\omega t, \quad (1)$$

where
  V = peak excitation voltage,
  a = damping coefficient,
  t = time,
  $\omega = 2\pi f$, and
  e = natural logarithm base.

The output power of the transducer needs to be as high as possible; the power level is a function of the excitation voltage. In the above formulation, since the damping coefficient, a, is fixed by the circuit parameters, the ringdown time is also directly proportional to the peak excitation voltage V. Losses through the acoustic window in the sonde, losses and scattering through the highly attenuating borehole fluid and acoustic absorption by the sidewall material cause a 35 to 40 dB energy loss in the returned echo signal. Thus, if $t_e$ is the arrival time of the echo signal, the ringdown time must be optimized such that $v<<v_3$, where $v_e$ is the signal level of the echo. If the inequality is not satisfied, trailing portions of the outgoing wavetrain will destructively interfere with the incoming echo signal.

Many prior-art acoustic scanning systems employed a transducer excitation frequency on the order of 2 mHz. Such systems usually employed some sort of AGC or a ramped gain function to amplify the weak reflected signal. See for example, U.S. Pat. No. 4,691,307 issued Sep. 1, 1987 to Rambow; U.S. Pat. No. 4,855,965, issued Aug. 8, 1989 to Rambow et al; and U.S. Pat. No. 4,984,221, issued Jan. 8, 1991 to Dennis. At frequencies in the megahertz range, the ringdown time is quite short and is not of concern.

The choice of excitation frequency is a compromise between the need for signal penetration through the drilling fluid using a longer-wavelength pulse and the need for spatial resolution that is achievable using shorter wavelengths albeit at the expense of higher signal transmission losses. In the implementation herein disclosed, an excitation frequency of 250 kHz is employed as a preferable compromise.

For a small borehole diameter such as 4.75 inches and in the presence of a drilling fluid that is characterized by a fast acoustic propagation velocity, the acoustic-pulse round-trip flight time is about 33 microseconds ($\mu$s). At a transducer excitation frequency of 250 kHz, the period of one cycle of the caudal wavetrain is 4 $\mu$s. An outgoing acoustic wavetrain having a ringdown time of 40 $\mu$s (10 cycles) could destructively interfere with the weak incoming echo pulse. The transducer excitation voltage must be reduced to shorten the ringdown time. But as the diameter of the borehole increases, the transducer excitation voltage must be increased proportionately.

One method that was previously used to select the proper ringdown time required that the operator remove the sonde from the borehole and to empirically manipulate an iron slug with respect to an inductive circuit. But in the event that the diameter of the hole changed after the initial adjustment, it was not possible to re-tune the pulser circuit from the surface with the sonde still in place; the sonde first had to be withdrawn from the borehole, an expensive and time-consuming task.

There is a need for a system for discretely optimizing the ringdown time of the transmitted acoustic pulse to prevent interference with the returning echo signal while maintaining maximum signal output power commensurate with the borehole diameter. The system should be operator-controllable to accommodate abrupt changes in the borehole parameters.

SUMMARY OF THE INVENTION

In accordance with this invention, there is provided an acoustic borehole televiewer that includes at least one acoustic transducer rotatingly mounted on a logging sonde adapted to be moved along the longitudinal axis of a borehole. Circuit means, mounted in said sonde and coupled to the transducer, cause the transducer alternately (1) to project acoustical pulses against successive circumferential portions of the borehole sidewall and (2) to receive echoes of the pulses as reflected from the respective sidewall portions. The circuit means includes a pulser circuit for generating an excitation voltage to drive the transducer when it is in the pulse-projecting mode. The pulser circuit includes discrete control means for adjusting the ringdown time of the transducer excitation voltage. In one embodiment, the control means may be actuated from the surface.

In accordance with an aspect of this invention, the pulser circuit includes a capacitor coupled across a transformer through a firing switch. A source of power is provided for charging the capacitor. The transducer is energized when the firing switch is closed in response to a trigger pulse such that the capacitor discharges through the transformer winding to generate the transducer excitation voltage. A variable timer means, operatively coupled to the firing switch, controls the total time that the switch is closed, thereby to define a preselected fraction of the total charge on the capacitor that is dissipated through the transformer. The ringdown time of the excitation voltage is a function of the fractional capacitor charge that is delivered to the transducer through the transformer.

In accordance with yet another aspect of this invention, the time constant of the variable timer is selectable by means of a digital code. The digital code causes a multiplexer in the sonde to connect a desired resistance into an RC circuit that is operatively coupled to a one-shot. In response to a trigger pulse, the one-shot closes the firing switch for a period of time equal to the RC time constant.

BRIEF DESCRIPTION OF THE DRAWINGS

These and other advantages of this invention will be better understood by reference to the appended detailed description and the drawings wherein.

DETAILED DESCRIPTION OF THE PREFERRED EMBODIMENT

Figure 1:
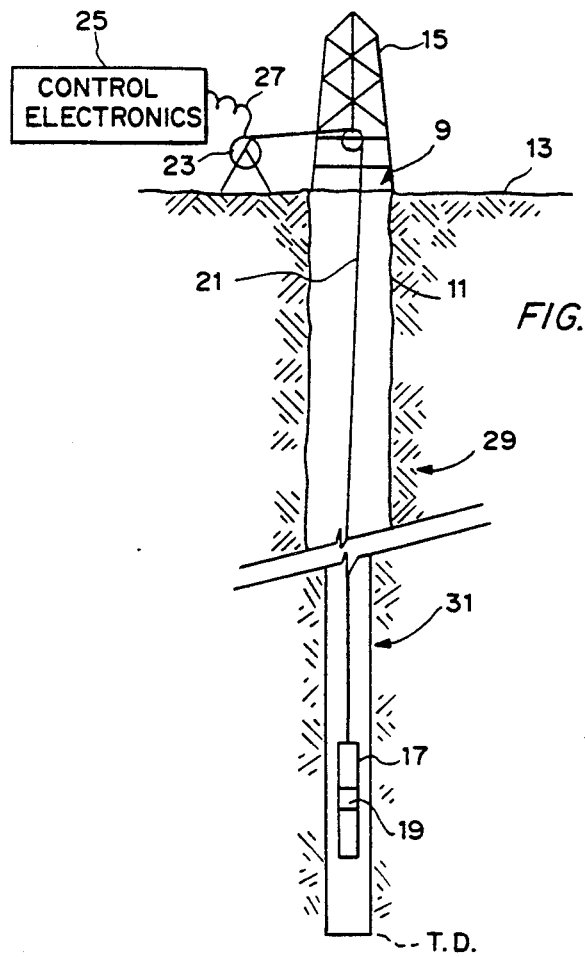
FIG. 1 is a cross section of the earth showing a logging tool in a bore hole.

FIG. 1 shows a borehole 9 having a sidewall 11, drilled from the earth's surface 13 by drill rig 15 to some depth TD. A logging sonde 17 having an acoustic window 19, behind which are mounted one or more rotating piezoelectric transducers of any well-known type. The sonde is drawn along the longitudinal axis of borehole 9 at the end of a logging cable 21 that is manipulated by a draw works 23 at the well head. Electronic recording, control and display equipment 25 is located near the draw works as shown. Electrical conductors in 7-conductor logging cable 21 are connected to the control equipment 25 by lines 27. It will be observed that portions 29 and 31 of borehole 9 have different diameters.

Figure 2:
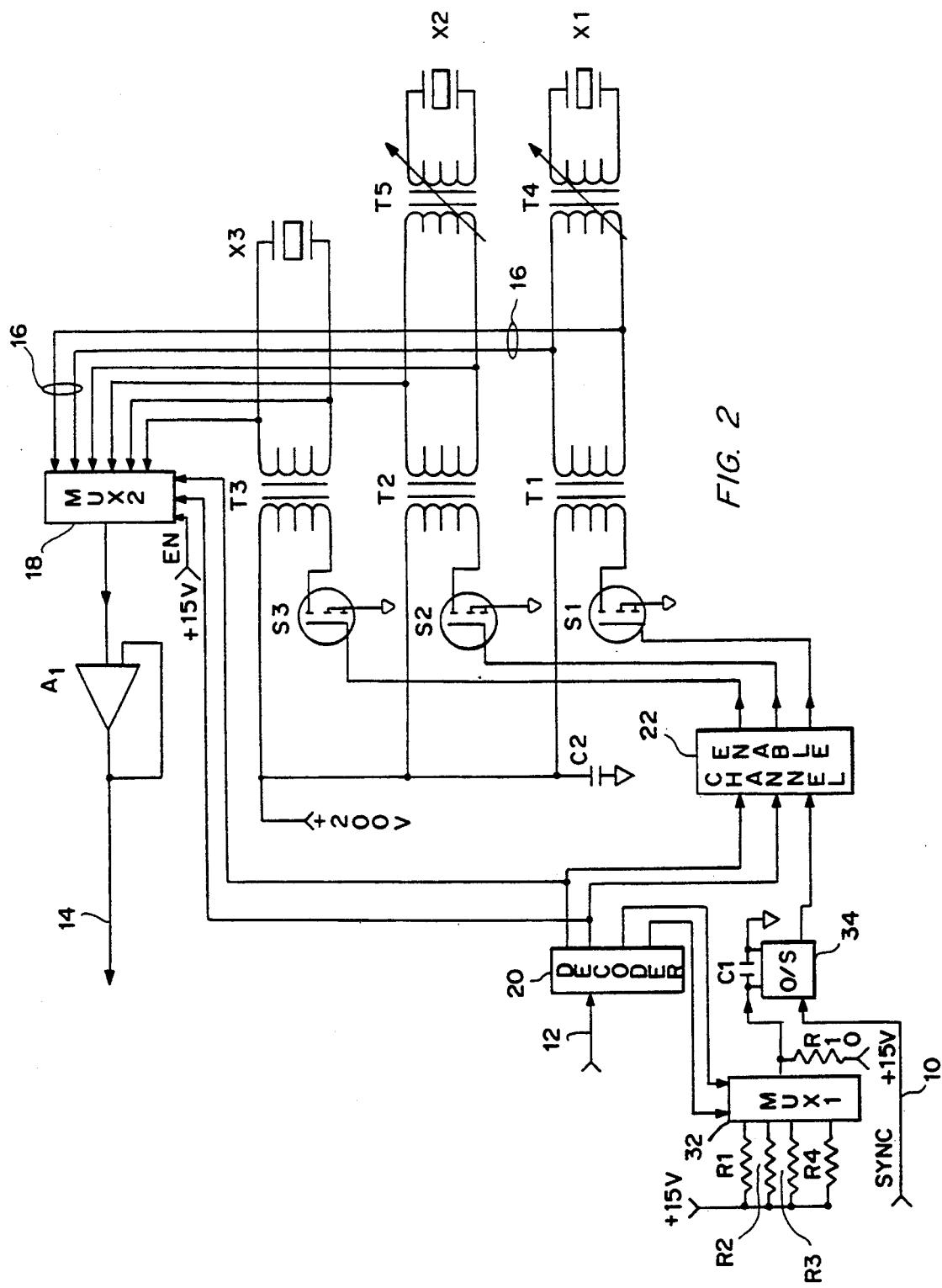
FIG. 2 is a schematic drawing of the circuitry in accordance with this invention.

FIG. 2 is an overview of the essential portions of the preferred pulser circuitry of this invention. The circuit parameters to be described are exemplary only and should not be construed to be limiting in any way.

Preferably, the system as shown in FIG. 2 is mounted in logging sonde 17. Control lines 10 and 12 and signal output line 14 are coupled to surface equipment 25 via logging cable 17 along with other lines, not shown, such as for power. Three transducers, X1, X2 and X3 are shown although more or fewer could be used. Transducers X1 and X2 are mechanically and electrically coupled in the sonde by rotary transformers T4 and T5 of any well-known type. Transducers X1 and X2 consist of hemispherically-shaped piezoelectric elements having different focal lengths and are selectable in accordance with the diameter of the borehole. Transducer X3 is fixed and is used in cooperation with a mud cell as a velocimeter for measuring the velocity of the borehole fluid in any well-known manner.

Essentially, the pulser circuit consists of a 0.1 $\mu f$ capacitor C2 that is normally fully charged to a potential E, such as 200 volts from a DC power source (not shown). Periodically a normally-open trigger switch, such as S1, which may be a Texas Instruments IRF840 FET, is closed for a preselected time interval (to be discussed later), whereupon a fraction e, of the full capacitor charge is dissipated through a transformer such as T1, which may be an HTC X5413, to provide an excitation voltage to drive transducer X1, thereby to insonify the borehole sidewall. The period between switch closures depends upon the desired scan rate which preferably may be 125 to 250 samples per scan at 6 scans per second. After each excitation cycle, the transducer passively assumes a listening mode for detection of a returning echo signal. The detected signal is transmitted over lines 16 to output multiplexer 18, such as HARRIS HI-1-509-2, thence to amplifier A1, such as a BURR-BROWN OPA27SM operational amplifier, and to output line 14 for transmission to the surface equipment 25 over logging cable 21. The above sequence of events may also apply to the other two transducers X2 and X3.

Figure 3:
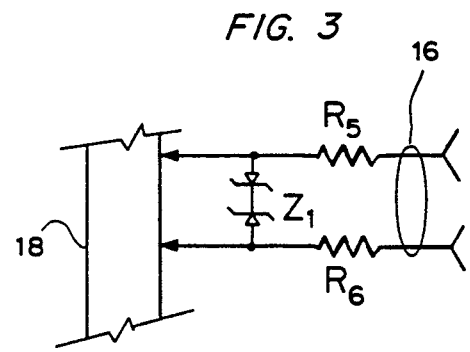
FIG. 3 is a detail of the over-voltage protection at the input of the output multiplexer.

The output lines such as 16 are permanently connected to the output multiplexer 18 so that the outgoing signal as well as the incoming echo signal may be monitored at the surface equipment. When a transducer such as X1 is excited, an over-voltage is generated across lines 16. Referring to FIG. 3, a pair of Zener diodes along with 10k resistors R5 and R6 (for simplicity not shown in FIG. 1) are introduced into lines 16 to absorb the over-voltage. Similar circuitry is provided for the other two pairs of lines coupled to T2 and T3.

In operation, transducer X3 and either X1 or X2, depending upon the borehole diameter, are sequentially activated. The channel selection is provided by a first binary code issued from logic within the sonde or transmitted from the surface control equipment 25 over line 12 to a decoder 20 such as a RCA CO4094BF shift register. In response to the binary code, decoder 20 causes channel-enable module 22, which may be an RCA CD4556BF/3A dual binary decoder, to activate the appropriate switch S1, S2, or S3.

As before stated, it is desired to optimize the ringdown time such that maximum power may be applied to the transducer(s) without causing destructive interference between the outgoing pulse train and the incoming echo signal. The ringdown time mat be discretely controllable from the surface equipment.

Figure 4:
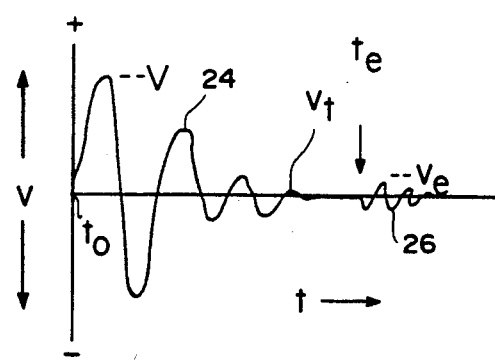
FIG. 4 depicts a wavetrain having a short ringdown time.
Figure 5:
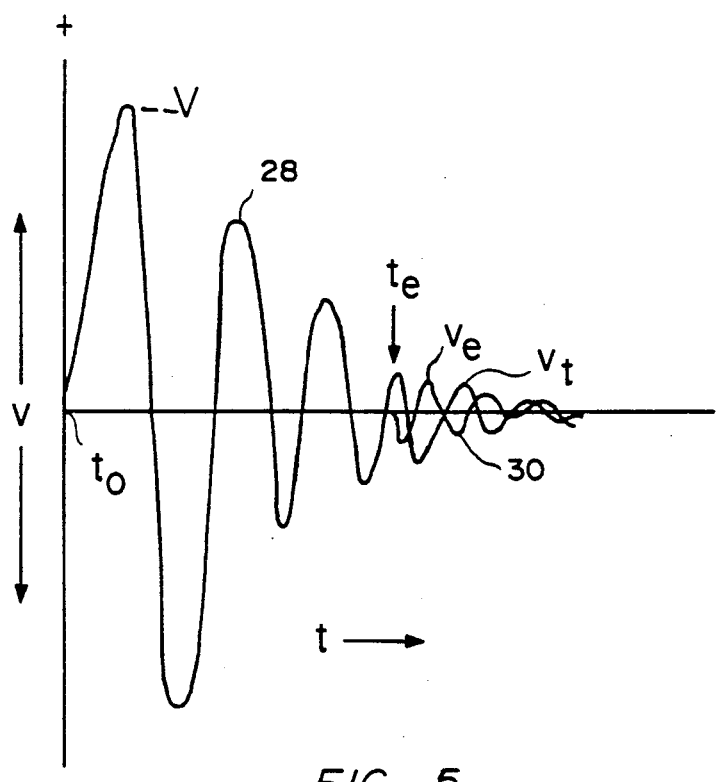
FIG. 5 illustrates an outgoing wave train having a long ringdown time and destructive interference with a returning echo signal.

FIGS. 4 and 5 serve to illustrate the problem as well as to define certain terminology. In the Figures, the vertical axis is excitation voltage V and the horizontal axis is time, t. At time $t_o$, FIG. 4, an excitation voltage V is applied to a transducer, giving rise to the wavetrain 24 which decays exponentially to a very low level $v_t$ at some time $t_r$, prior to time $t_3$, the expected arrival time of the echo signal. Time $t_r$ is the ringdown time. The echo signal 26, having an amplitude level $v_e$, reversed in phase, arrives at time $t_e$. There is a clear separation between the trailing portion of the outgoing pulse 24 and the returning echo signal 26. The rise time $t_i$ of the excitation voltage from $v=0$ to $v=V$ is one-quarter cycle of the natural frequency or 1 $\mu s$ at a frequency of 250 kHz.

In FIG. 5, the initial excitation voltage level V of transient 28 is much higher than that of FIG. 4. The ringdown time is longer and interference with returning echo 30 occurs.

Figure 6:
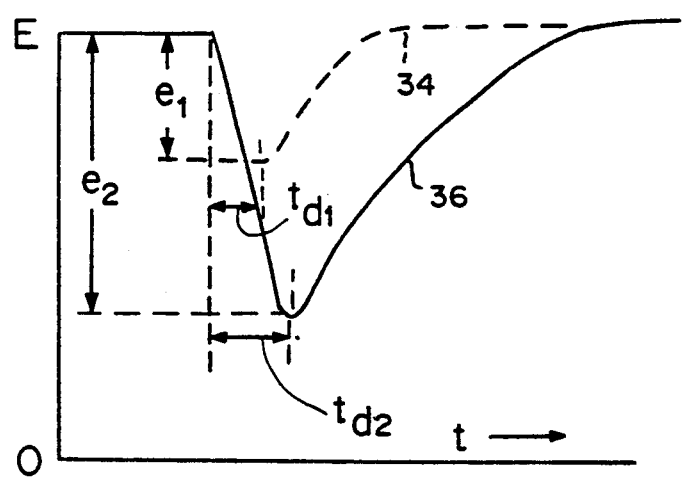
FIG. 6 shows the relation between capacitor discharge time and output voltage level.

FIG. 6 illustrates the fraction e, of full charge E across a capacitor such as C2, that is available from the capacitor as a function of discharge time $t_d$. The minimum value $e_1$ of dashed curve 34 is the result of a relatively short discharge time $t_{d1}$ such as might have been used in the circumstance of FIG. 4. The voltage minimum $e_2$, solid curve 36, is exemplary of a longer discharge time $t_{d2}$.

Refer back to FIG. 2. Multiplexer 32, such as a HARRIS HI 1-508-8, 8 channel multiplexer, and one-shot 34, such as MOTOROLA MC14528BAL, in combination, furnish means for discretely adjusting the ringdown time of the excitation voltage applied to the transducer selected by channel-enable module 22. An RC circuit having a variable time constant is connected across one-shot 34. The circuit is composed of 33 pf capacitor C1, a 49.9k fixed resistor R10 and a variable resistor network including resistors R1-R4, each of which has different value ranging from 1k$\Omega$ to 35k$\Omega$. Any one of resistors R1-R4 may be selectively coupled in parallel with R10 by multiplexer 32. The choice of resistors R1-R4 is discretely selectable by multiplexer 32 in response to a binary code transmitted from control equipment, which may be part of surface equipment 25, to decoder 20 and thence to multiplexer 32. The time constant of the RC circuit, as established by the selected resistor value, defines the set time of the one-shot 34. In response to a trigger command received over line 10, one-shot 34 closes a switch, such as S1, for the duration of the set time as defined by the RC time constant. Capacitor C2 discharges a preselected fraction of the full capacitor charge through transformer T1. The charge fraction is a function of the one-shot set time, $t_d$, as defined by the RC time constant.

To summarize the preferred mode of operation, the logging sonde with its transducers is first lowered into borehole 9 to a desired depth. Thereafter, it is withdrawn at a fixed rate of travel. At each sample interval, transducers X1 or X2 and X3 are activated in sequence, in response to a binary code from the control electronics at the well head on the surface, to insonify the borehole sidewall and to receive the returning echo signal. Both the outgoing acoustic signal and the returning echo signal are transmitted through the logging cable to the control and display module 25 at the surface where the signals may be recorded and/or displayed The ringdown time is discretely selected by means of a binary code transmitted from control electronics to multiplexer 32 as previously explained. From a practical standpoint, the operator of the logging tool may select the desired ringdown time empirically by observing the separation between the outgoing and returning signals on a real-time monitor display. In FIG. 1, the borehole diameter is relatively small at borehole region 31; a short ringdown time would be appropriate there. As the sonde 17 is drawn upwards, to region 29, the borehole diameter increases substantially so that a higher excitation voltage and a longer ringdown time would be in order to provide greater penetration power. Thus, the ringdown time of the acoustic pulse may be discretely selected by the control equipment to accommodate changing parameters of the borehole as the sonde is moved along the length of the borehole.

The details of the embodiments described herein are exemplary and in no way limiting. Those skilled in the art will no doubt consider modifications in these teachings but which will nevertheless fall within the scope and spirit of this invention which is limited only by the appended claims.

What is claimed is:

1. An acoustic borehole televiewer that includes at least one transducer rotatably mounted on a logging sonde that is adapted to be moved along the longitudinal axis of a borehole, comprising:
    circuit means, mounted in said sonde and coupled to said transducer for periodically causing said transducer alternately to
    (a) project acoustical pulses against successive circumferential portions of the borehole sidewall, and
    (b) to receive echoes of said acoustical pulses as reflected from the respective sidewall portions;
    said circuit means including a pulser circuit means for generating a transducer excitation voltage for causing said transducer to emit an acoustic pulse when said transducer is in the pulse projecting mode;
    control means, included in said circuit means, for discretely adjusting the ringdown time of the emitted acoustic pulse;
    a transformer, having an input, for coupling said pulser circuit with said transducer;
    a capacitor, including a source of power for fully charging said capacitor, coupled across said transformer input; and
    means, responsive to a trigger signal, for defining the ringdown time of the acoustic pulse emitted by said transducer by discharging a preselected fraction of the full capacitor charge across the transformer input.

2. The borehole televiewer as defined by claim 1, wherein said trigger-signal responsive means comprises:
    firing switch coupled in series with said capacitor and said transformer input;
    timer means, operatively coupled to said firing switch, for selecting the fractional charge delivered to said transformer input from said capacitor, by controlling the closure time of said firing switch.

3. The borehole televiewer as defined by claim 2, wherein the timer means comprises:
    a re-triggable one-shot device;
    an RC timing circuit network connected across said retriggerable one-shot;
    a multiplexer for defining the set time of said retriggerable one-shot by inserting a selected resistance into said RC timing circuit in response to a digital code from said control means.

4. An acoustic down-hole televiewer for scanning the physical characteristics of the sidewall along the length of a borehole, comprising:
    a logging sonde moveable within a borehole;
    at least one transducer rotatably mounted on said sonde;
    means for periodically exciting said transducer to emit an acoustic pulse;
    means, located on the surface, for discretely selecting the ringdown time of the emitted acoustic pulse to accommodate changing physical parameters of the borehole as the logging sonde is moved therealong; and
    said means for discretely selecting the ringdown time of said acoustic pulse includes a charged capacitor and means for applying an excitation voltage from said capacitor to said transducer, the excitation voltage level being a preselected fraction of the total capacitor charge.

5. The acoustic borehole televiewer as defined by claim 4, comprising
    a normally-open switch means operatively coupled between said capacitor and said transducer; and
    means for closing said switch means for a preselected time period, thereby to define the fractional level of the capacitor charge that is applied to said transducer.

6. The acoustic borehole televiewer as defined by claim 5, wherein:
    The ringdown time is a function of the preselected fractional charge level.

* * * * *